United States Patent
Bose et al.

(10) Patent No.: US 10,903,918 B2
(45) Date of Patent: Jan. 26, 2021

(54) COGNITIVE HF RADIO WITH TUNED COMPACT ANTENNA

(71) Applicant: ARIZONA BOARD OF REGENTS ON BEHALF OF THE UNIVERSITY OF ARIZONA, Tucson, AZ (US)

(72) Inventors: Tamal Bose, Tucson, AZ (US); Hao Xin, Tucson, AZ (US); Michael Marefat, Tucson, AZ (US); Hamed Asadi, Tucson, AZ (US); Ahmed Abdelrahman, Tucson, AZ (US); Min Liang, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 0 days.

(21) Appl. No.: 15/833,709

(22) Filed: Dec. 6, 2017

(65) Prior Publication Data

US 2018/0159642 A1    Jun. 7, 2018

Related U.S. Application Data

(60) Provisional application No. 62/431,326, filed on Dec. 7, 2016, provisional application No. 62/531,249, filed on Jul. 11, 2017.

(51) Int. Cl.
| | |
|---|---|
| *H04B 17/00* | (2015.01) |
| *H04B 17/309* | (2015.01) |
| *H01Q 1/36* | (2006.01) |
| *H01Q 9/38* | (2006.01) |
| *H04B 1/48* | (2006.01) |
| *H01Q 1/48* | (2006.01) |

(52) U.S. Cl.
CPC .......... *H04B 17/309* (2015.01); *H01Q 1/362* (2013.01); *H01Q 1/48* (2013.01); *H01Q 9/38* (2013.01); *H04B 1/48* (2013.01)

(58) Field of Classification Search
CPC ........ H04B 17/309; H04B 1/48; H01Q 1/362; H01Q 1/48; H01Q 9/38
USPC ...................................................... 455/67.11
See application file for complete search history.

(56) References Cited

U.S. PATENT DOCUMENTS

| | | | | |
|---|---|---|---|---|
| 5,361,072 A * | 11/1994 | Barrick | ..................... | G01S 7/35 342/133 |
| 5,631,611 A * | 5/1997 | Luu | .......................... | H03H 7/40 333/17.3 |
| 6,526,263 B1 * | 2/2003 | Saito | ..................... | H01Q 1/242 343/702 |
| 7,859,474 B1 * | 12/2010 | Cripe | ..................... | H03H 11/30 343/745 |
| 8,654,815 B1 * | 2/2014 | Forenza | ................ | H04L 5/0023 375/141 |

(Continued)

*Primary Examiner* — April G Gonzales
(74) *Attorney, Agent, or Firm* — Quarles & Brady LLP

(57) ABSTRACT

A cognitive HF radio is disclosed having a cognitive engine that optimizes HF transmission parameters on the basis of learned experience with previous transmission under varying transmission and environmental conditions. Additionally, electrically small HF antennas optionally using non-Foster matching elements are disclosed. Furthermore, another electrically small HF antenna and associated impedance matching networks are disclosed, including an impedance matching network using non-Foster matching elements.

14 Claims, 11 Drawing Sheets

(56) References Cited

U.S. PATENT DOCUMENTS

| | | | |
|---|---|---|---|
| 9,136,938 B1* | 9/2015 | Babich | H04B 10/25 |
| 9,941,950 B2* | 4/2018 | Babich | H04B 7/18504 |
| 2003/0227422 A1* | 12/2003 | Berry | H01Q 1/34 |
| | | | 343/895 |
| 2006/0229029 A1* | 10/2006 | Waltho | H04B 7/0837 |
| | | | 455/73 |
| 2010/0311325 A1* | 12/2010 | Marshall | H04B 13/02 |
| | | | 455/40 |
| 2012/0195351 A1* | 8/2012 | Banwell | H04B 1/525 |
| | | | 375/219 |
| 2013/0009722 A1* | 1/2013 | White | H03H 7/40 |
| | | | 333/17.3 |
| 2013/0009724 A1* | 1/2013 | Xu | H03H 11/30 |
| | | | 333/32 |
| 2013/0122819 A1* | 5/2013 | Vuyyuru | H04W 16/14 |
| | | | 455/62 |
| 2013/0187826 A1* | 7/2013 | Hutcheson | H01Q 1/243 |
| | | | 343/860 |
| 2014/0087749 A1* | 3/2014 | Mar | H04L 5/0023 |
| | | | 455/452.2 |
| 2015/0318607 A1* | 11/2015 | Chieh | H01Q 5/35 |
| | | | 343/749 |
| 2015/0318612 A1* | 11/2015 | Karlsson | H01Q 7/00 |
| | | | 343/852 |
| 2017/0054482 A1* | 2/2017 | Forenza | H04B 7/0626 |

* cited by examiner

COGNITIVE HF RADIO WITH TUNED COMPACT ANTENNA

CROSS-REFERENCE TO RELATED APPLICATIONS

This application claims priority to and the benefit of U.S. Provisional Application No. 62/431,326, filed on Dec. 7, 2016, and 62/531,249, filed on Jul. 11, 2017, the disclosures of which, are incorporated by reference herein in their entirety.

TECHNICAL FIELD

The present invention relates to systems for high-frequency (HF) radio communication, and more particularly, to a compact, tunable HF antenna for long range "skywave" or skip propagation communication, and a cognitive engine allowing an HF transmitter to learn, adapt and optimize itself for HF, long-range communication.

BACKGROUND OF THE INVENTION

"Skywave" or skip propagation is often used by amateur (i.e., "HAM") radio operators to directly communicate with people over the horizon. In some cases, radio communication can be accomplished using this propagation mode with people thousands of kilometers away using very low power and low bandwidth signals—on the order of just a few watts of power and bandwidths of less than 100 Hz. In the HAM radio community, this practice is known as "DXing", and it is a popular activity that allows communication between amateur radio operators all over the world without the need to use third party infrastructure like satellites or the internet.

Skywave propagation is made possible by refraction or reflection of IV radio signals as they travel through the ionosphere. As used herein, "HF" will refer to radio signals in the band between about 3 MHz and 30 MHz. The ionosphere is an extended region of the upper atmosphere ranging from about 60 km to about 500 km in altitude. The ionosphere is characterized by the presence of free electrons and ionized gas molecules created when cosmic rays and high energy photons (primarily in the UV) impact normally electrically neutral gas molecules. Because the ionosphere is created by solar effects, its extent and the distribution of charged particles within it, change with the diurnal cycle and with solar conditions.

Of particular relevance for skywave propagation is the ionospheric "F" layer. This layer exists between about 150 km and 500 km above the surface of Earth, and it is composed primarily of ionized light gas molecules like hydrogen and helium. Generally speaking, an HF signal launched at a small-angle (measured with respect to the surface normal of the Earth) encountering the F layer is bent, by refraction, away from the earth's surface normal. At certain frequencies and incidence angles, and under certain atmospheric conditions, this refractive bending can cause the signal to propagate back towards the Earth's surface, effectively having undergone total-internal-reflection, such that it can be received many hundreds of miles away over the horizon from its point of origination. Under certain circumstances, the signal can undergo multiple effective reflections between ionosphere layers, or between the ionosphere and the earth, resulting in even farther communication via "multi-skip" propagation.

Skip propagation occurs in two regimes. In Near Vertical Incidence Skywave (NVIS), a signal, typically on the low end of the HF spectrum between 2 and 110 Mhz, is launched at a very small angle with respect to the Earth's surface normal. Launch angles can approach 90 degrees, or near vertical. The signal reflects off the F-layer and returns to the Earth's surface about 100-200 miles away. In conventional skywave, a signal is launched at a larger angle with respect to the earth's surface normal, and returns to earth a greater distance away—typically about 1200 miles, but distances of 2500 miles are possible with one skip off the ionosphere.

Skywave effects are frequency dependent. The lowest usable frequency (LUF) is the lowest frequency that can be used to communicate using skywave propagation between two specific points on Earth at a given point in time. Frequencies below the LUF are completely absorbed by the ionosphere. The maximum usable frequency (MUF) is the highest frequency that can be used to communicate using sky-wave propagation between two specific points on Earth. Radio signals with a frequency above the MUF pass right through the ionosphere. Because the ionosphere changes with solar conditions, the LUF and MUF are constantly changing and can be difficult to predict. They are both generally lower at night and higher during the day. For example, during the day, conditions are generally good for propagation in the 14-30 MHz band, whereas signals in the 3-10 MHz band propagate well at night.

A further challenge to long distance communication in the HF domain relates to antenna configuration, and especially to antenna size. A half-wave dipole antenna optimized for 80 m (in the range of 3.5-4 Mhz), would be 40 m long. A quarter-wave monopole (e.g., a vertical antenna) would be 20 m high. Even with the use of loading coils to electrically lengthen vertical antennas, the physical size of HF antennas renders them impractical for many applications, e.g., for people who live in apartments or under home owner association rules that do not permit large antennas.

SUMMARY OF THE INVENTION

Embodiments of the invention are directed to systems and methods for facilitating HF communication via skywave propagation. In one embodiment, the invention includes a physically compact, electrically small, frequency tunable antenna optimized for maximal gain at small-angles. In certain embodiments, the inventive antenna includes helical radiative elements arranged around a central helix. In another embodiment, the invention includes a compact, helical, single-element antenna optimized for HF use, which is about 6 m in overall length. Alternative embodiments include a switching network and an array of impedance matching circuits configured to allow transmission over multiple discrete frequency bands within the HF band. In certain embodiments, impedance matching circuits include non-Foster elements having negative impedance and capacitance, enabling impedance matching over a greater frequency bandwidth. Still further embodiments include a transceiver having a cognitive engine that senses both environmental conditions and transmission conditions, and intelligently alters communication parameters such as modulation, coding, pulse shape, equalization filters, transmit power, etc., to optimize transmission under a given set of sensed environmental conditions.

In one embodiment, the invention includes a compact HF antenna having a first vertically oriented helical radiative element with a bottom end and a top end. The antenna also includes a feed line extending vertically in an upward direction from the top end to a vertex, and a plurality of oblique helical radiative elements, each having a top end connected to the feed line at the vertex, and each oblique helical radiative element extending down and away from the vertically oriented helical radiative element.

In another embodiment, the invention includes an HF transceiver having a transmit-receive module capable of transmitting and receiving radio signals within the HF hand. The transceiver also has a first switching network electrically connected to the transmit-receive module, at least one impedance-matching circuit connected to the first switching network, a second switching network connected to the at least one impedance-matching circuit and an electrically small antenna electrically connected to the second switching network. The at least one impedance-matching circuit includes non-Foster elements having negative impedance over a preselected frequency range.

Other embodiments are directed to a method of sending an HF radio signal with a configurable HF transceiver in communication with a cognitive engine (CE). The method includes the steps of detecting a first set of environmental transmit conditions, detecting a first set of transmit configuration conditions, transmitting an HF signal under the first sets set of environmental and transmit configuration conditions, receiving feedback from a receiver indicating that the transmitted HF signal has been or has not been successfully received and storing data relating to the first set of transmit conditions, the first set of environmental transmit conditions and the received feedback in a database.

Other embodiments are directed to an HF transmission system. The system includes an HF transceiver configurable to transmit an HF signal under a variety of transmit parameters, an antenna in electronic communication with the HF transceiver, a sensing module connected to one or more data inputs, a programmable processor, and non-volatile storage including computer readable instructions executable by the programmable processor. The instructions are executable by the processor to cause it to determine a first set of environmental parameters sensed by the sensing module, determine a first set of transmission parameters determined by the configuration of the HF transceiver and determine whether a first transmission sent by the HF transceiver under the first set of environmental and transmission parameters was successfully received by a receiver.

Embodiments of the invention have certain advantages. For example, embodiments of the invention provide a reliable long-range HF networking system, under a highly dynamic channel environment defined by varying parameters such as weather conditions, various daytime ionospheric reflections, and tunable transmit power. Other embodiments provide an antenna that is reconfigurable, electrically small, and provides a low-angle omnidirectional transmission for long-range communications via the ionosphere. In certain embodiments, the HF antenna uses an electronically switched tuning network using high power PIN diodes to switch among an array of n matching circuits, each of which is tuned at a discrete frequency in the HF band. Other embodiments provide an alternative antenna design that is light weight and electrically small, but can support transmission over a wide frequency range using an active non-Foster matching technique with non-Foster reactance elements, e.g. negative capacitance or negative inductance, which exhibit negative slope with frequency in a broad bandwidth. Impedance matching with such elements bypasses the restrictions of gain-bandwidth theory. Certain embodiments of the invention include a cognitive radio engine (CE) connected to control radio transmission parameters in order to select the optimum combination of modulation, coding, pulse shape, equalizer, power, etc., for the given current propagation conditions, available bandwidth, and desired data rate by employing various machine learning and optimization methods.

Additional advantages will become clear upon consideration of the following detailed description of the preferred embodiments.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

Figure 1:
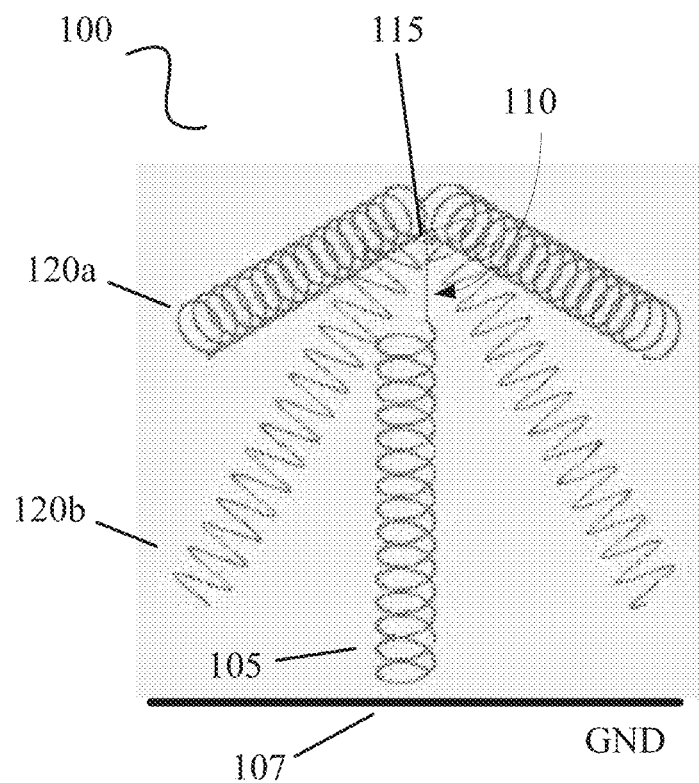
FIG. 1 is a schematic diagram of a compact, electrically small antenna according to an embodiment of the invention.

FIG. 1 shows a schematic representation of a compact, electrically small antenna 100 according to an embodiment of the invention. The antenna of FIG. 1 includes a first helical radiative element 105 having a long axis extending vertically up from a horizontal ground plane 107. The first helical radiative element 105 terminates in a linear feed line 110, which itself terminates in a vertex 115. Extending down and away from vertex 115 are a plurality of radially distributed helical radiative elements 120a, b, etc. in the embodiment of FIG. 1, there are four radially distributed elements 120a, b, etc., arranged symmetrically about the vertical (i.e., the long) axis of element 105, such that there are 90 degrees between the radial elements. In the embodiment of FIG. 1, radial elements 120a, b are inclined down and away from the axis of vertical element 105 such that a long axis of each radial element 105 makes an approximate 45 degree angle with both the horizontal and the vertical.

The physical dimensions of the elements of antenna 100 are selected to support a wide tuning range supporting transmission throughout the HF band from 3 to 30 MHz in normal helical mode. In one embodiment, the length of central helical radiative element 105 including the short feed line 110 to vertex 115 is approximately 1.8 meters. In this embodiment, the length of each radial helical element 120a, b is approximately 1.5 meters. In the same embodiment, there is one turn of the helix in all radiative elements for every 10 cm of length, and the circumference of the helixes is approximately 30 cm. Because of its use of helical radiative elements, the antenna of FIG. 1 is electrically small, i.e., is physically much smaller than the longest free space wavelength it is designed to support, which in this case is about 100 M. Due to the helical structural, the antenna of FIG. 1 has the advantage of a longer electrical length with small overall physical height, which enables it to be tuned to smaller frequency bands in comparison with a conventional monopole antenna of the same height. For example, a helical antenna of 2 m height, 30 number of turns, and 5 cm radius has a total wire length equal to 10 m (five times the antenna height), which can be operating at the 40 m band (7.5 MHz). A tunable matching circuit is also used to change the resonate frequency of the antenna to allow it to cover the frequency from 3-30 MHz.

Figure 2:
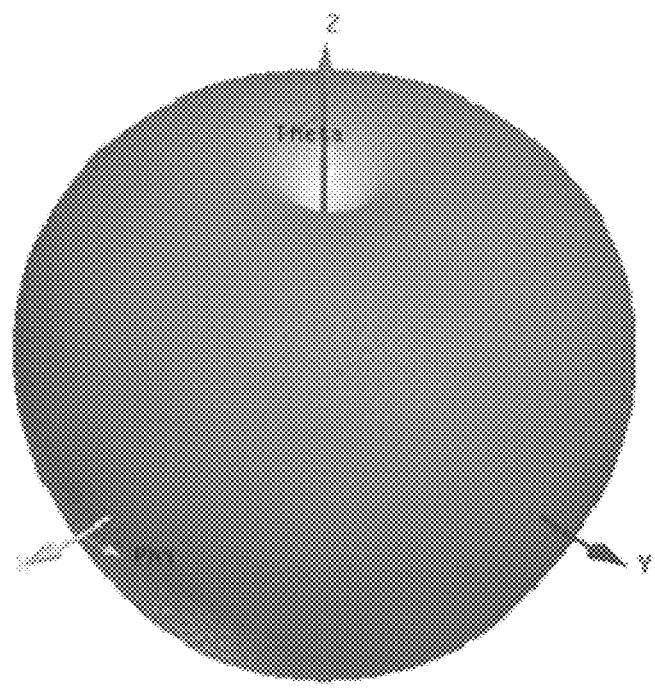
FIG. 2 is a plot of the gain pattern for the antenna of FIG. 1.

FIG. 2 illustrates the gain pattern for the antenna design of FIG. 1. As can be seen, the radiation pattern is omnidirectional and toroidal, not unlike the radiation pattern of a conventional di scone antenna, but has a high-gain bias near the z axis (i.e., the vertical axis of the vertical helical element, or the surface normal of the earth). This is useful for skywave propagation, which must launch signals at small-angles to intercept the ionospheric layers.

Figure 3:
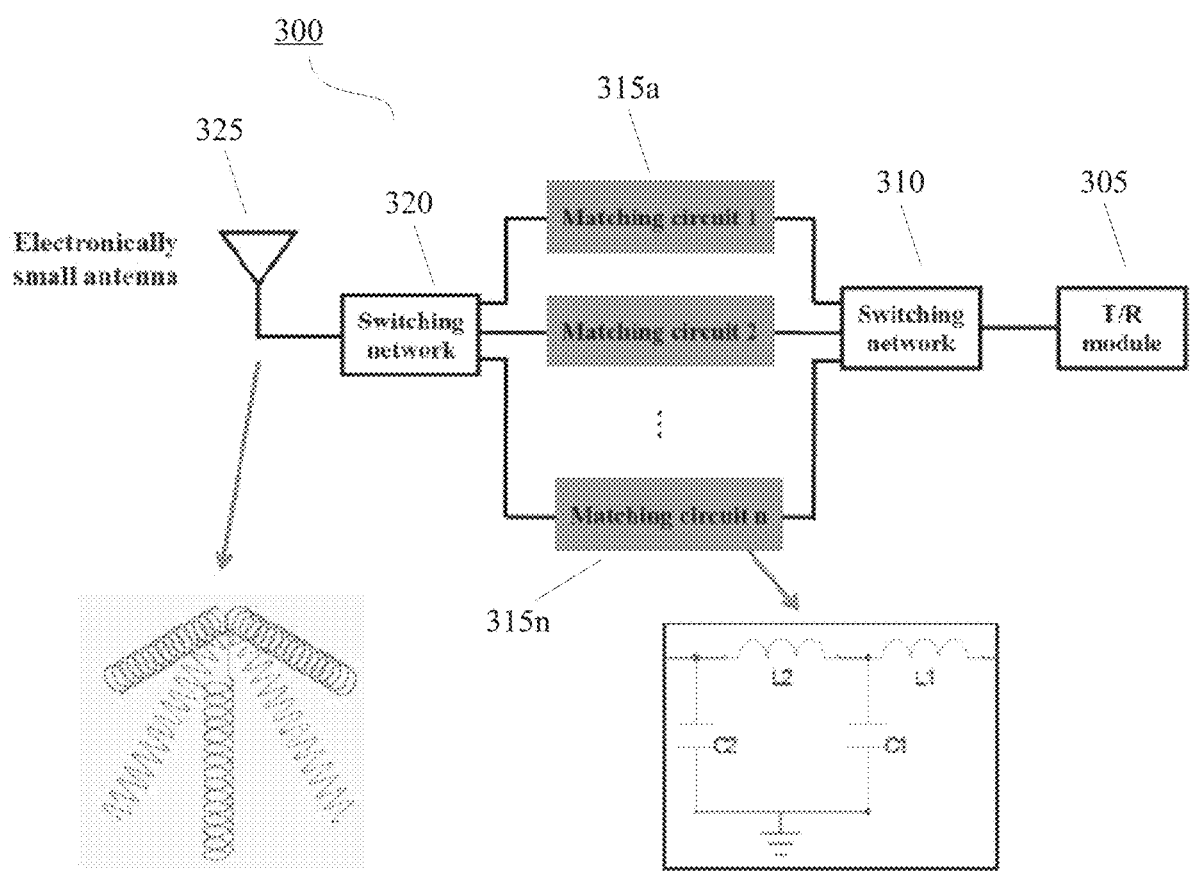
FIG. 3 is a schematic diagram of an HF radio transceiver using the antenna of FIG. 1.

FIG. 3 is a schematic diagram of a transceiver system using the antenna of FIG. 1. In the system 300 of FIG. 3, a transmit/receive module 305 is provided, which supports transmission and receipt of radio signals at least over the 3-30 MHz HF band. Transmit/Receive module 305 is electrically coupled to a switching network 310, which alternatively couples T/R module 305 to one of an array of impedance matching circuits 315a-n, which in turn are alternatively coupled through a second switching network 320 to antenna 325. Switching networks 310 and 320 use high power PIN diodes to effect switching. Impedance matching circuits 315a-n match the input impedance of antenna 325 to the impedance of all the upstream components, and in particular, the T/R module 305. Each impedance matching circuit 315a-n is configured, i.e., through selection of the value of components L1, L2, C1, C2, to provide impedance matching at a predetermined narrow bandwidth centered on a predetermined center frequency. In this way, antenna 325 can be tuned within the 3-30 MHz high frequency band by switching among matching circuits 315a-n. While the antenna 325 of the system of FIG. 3 is the antenna described above with respect to FIG. 1, this is not a requirement. Any wide-band, HF antenna, particularly antennas capable of high, low-angle gain over the HF spectrum is acceptable, as are other antenna designs.

Because it is tunable across the HF spectrum, the system of FIG. 3 is particularly useful for long distance skywave communications. This is because, as is discussed more fully below in regards to FIG. 5, ionospheric conditions are constantly changing, as a result of weather, time of day, and solar conditions. Because of these constantly changing environmental conditions, it is helpful to have a frequency agile, tunable transmitter to select a frequency that will support ionospheric propagation under whatever conditions prevail at the moment of transmission.

Figure 4A:
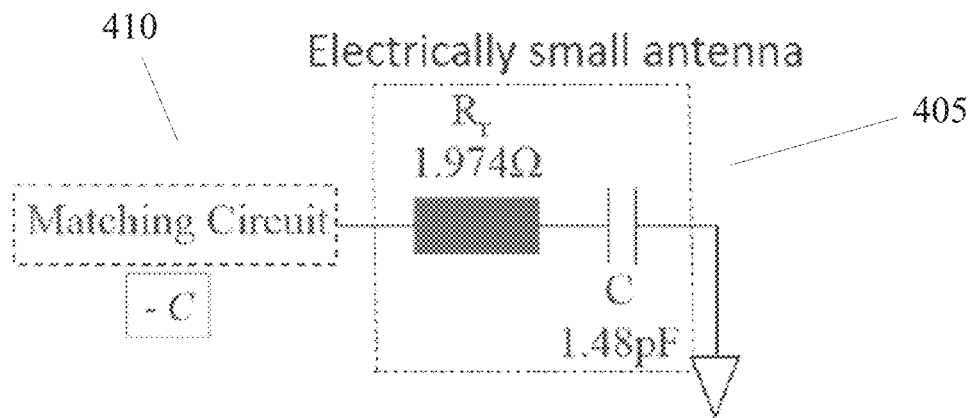
FIGS. 4a and 4b are schematic diagrams of broadband antenna systems according to embodiments of the invention.
Figure 4B:
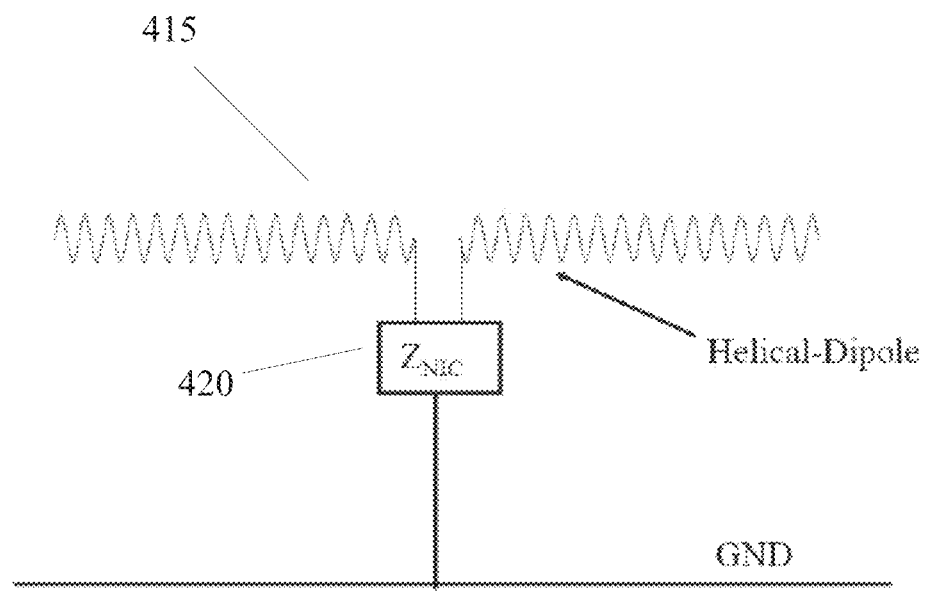

FIGS. 4a and 4b schematically illustrate an alternative antenna arrangement, which enables continuous tuning across the HF band without the need for discrete impedance matching circuits using passive components, such as are illustrated above with respect to FIG. 3. FIG. 4a shows an electrically small antenna 405. The equivalent impedance of antenna 405 is modeled by a resistive and capacitive load as pictured. Rather than impedance matching antenna 405 using a passive matching network, antenna 405 is coupled to a matching circuit 410, which includes active components having negative impedance—in the case of the system of FIG. 4a, negative capacitance to match the capacitive load that would be present in antenna 405 if it were a small monopole.

Figure 13:
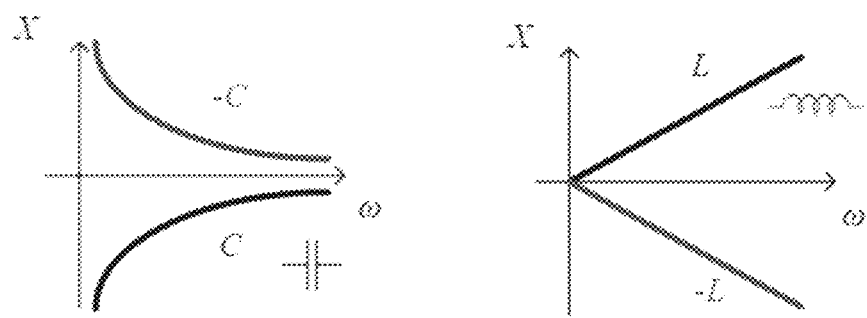
FIG. 13 shows plots of reactance vs. frequency for positive and negative capacitance devices and for positive and negative inductance devices.

In order to circumvent the bandwidth limitation of some electrically small antennas, embodiments of the invention such as those depicted in FIGS. 4a and 4b incorporate active non-Foster elements into the matching network. Foster's reactance theorem states that the reactance of a passive lossless two-terminal network always strictly monotonically increases with frequency. However, non-Foster reactance elements, e.g. negative capacitance or negative inductance, exhibit negative slope with frequency in a broad bandwidth. A comparison of impedance vs. frequency for Foster vs. non-Foster elements (i.e., conventional vs. negative impedance components) is shown in FIG. 13 which shows a plot of reactance vs. frequency for a positive capacitance device (denoted by "C") and a negative capacitance device (denoted by "—C") and a plot of reactance vs. frequency for a positive inductance device (denoted by "L") and a negative inductance device (denoted by "–L"):

Referring again to FIG. 4a, in the event that antenna 405 is a small monopole antenna, it will exhibit a large capacitive reactance. The use of active non-Foster components in matching circuit 410, specifically a negative capacitor placed in series with antenna 405, can cancel the reactance of the small dipole antenna.

FIG. 4b shows an alternative arrangement using non-Foster impedance matching components. In the arrangement of FIG. 4b, a small-size helical dipole antenna 415 is coupled to a matching circuit 420 including active broadband matching non-foster elements.

Figure 5:
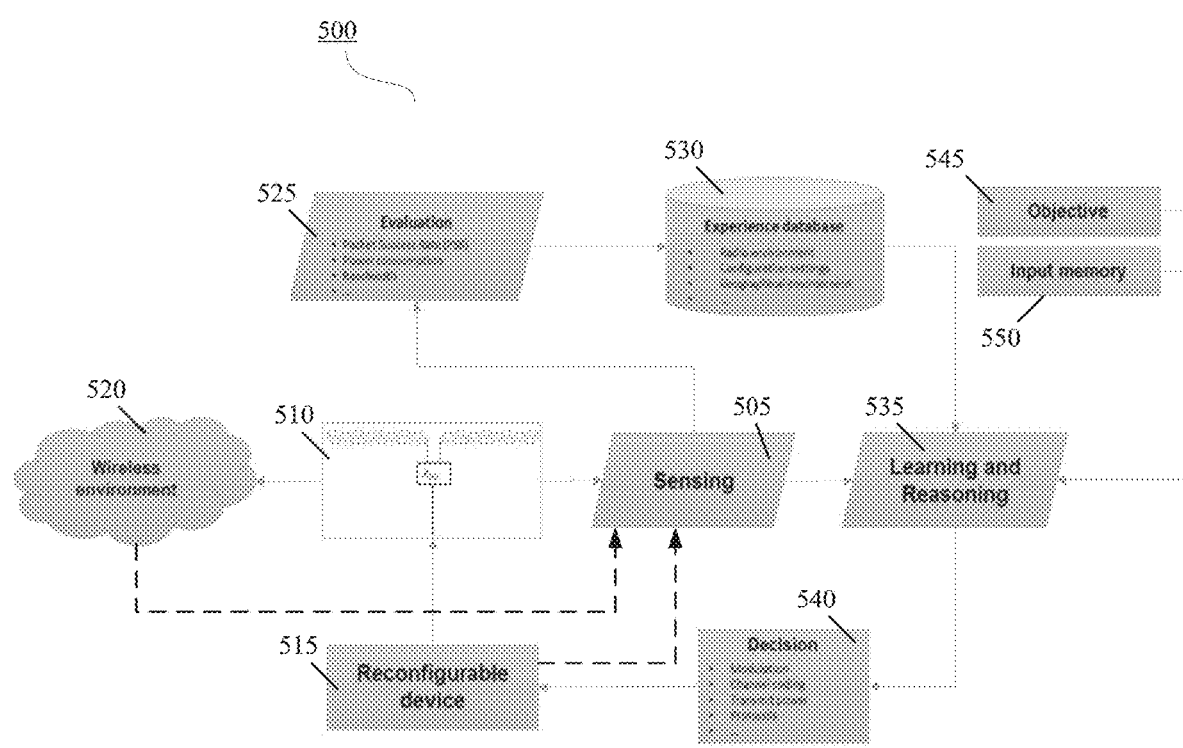
FIG. 5 is a block diagram showing functional modules used to implement an intelligent HF transceiver system using a Cognitive Engine (CE) according to an embodiment of the invention.

FIG. 5 is a block diagram showing functional modules used to implement an intelligent HF transceiver system using a cognitive engine ("CE") according to an embodiment of the invention. The system 500 of FIG. 5 includes a radio transceiver 515 coupled to an antenna 510. While antenna 510 is presented as a helical dipole antenna like the antenna of FIG. 4b, this is not a requirement. Antenna 510 could be an antenna like that shown in FIG. 1 or 6, or any other antenna capable of supporting radio transmission over the frequency range of interest, for example, over the spectrum. Transceiver 515 is a reconfigurable device, meaning that it is capable of altering various transmission parameters of a radio broadcast, including center frequency (i.e., carrier frequency), transmit power, bandwidth, pulse shape, modulation type and order (e.g., M-QAM, M-PSK, FSK, ASK, OFDM), channel coding algorithm, source coding algorithm, coding rate, data rate and type of networking protocol (e.g., TCP/IP, UDP, or other).

Reconfigurable transceiver 515 is coupled to and provides informational inputs to sensing module 505. Like other modules described herein, sensing module may be a dedicated hardware device including electronic I/O cards. In the exemplary embodiment of FIG. 5, sensing module 505, like other modules, is implemented by a programmable computer processor running computer readable instructions stored in a non-transitory computer readable medium, for example, in storage, which may also include experience database 530. When sensing module 505 is implemented on a programmable computer processor, it optionally includes input/output hardware to enable electronic communication with other devices and modules as shown. Sensor module 505 may optionally be implemented in an integrated package with transceiver 515, and in these cases may use the same programmable processor as one used by transceiver 515.

Informational inputs received by sensing module 505 from reconfigurable transceiver 515 include information related to transmission parameters and conditions, i.e., transmission configuration parameters associated with transceiver 515. Additionally, sensing module 505 can receive information regarding the available ranges of transmission parameters that can be provided by transceiver 515. For example, for a given transmission, sensing module 505 receives information related to one or more of a transmission's center frequency (i.e., carrier frequency), transmit power, bandwidth, pulse shape, modulation type and order (e.g., M-QAM, M-PSK, FSK, ASK, OFDM), channel coding algorithm, source coding algorithm, coding rate, data rate and type of networking protocol (e.g., TCP/IP, LOP, or other). Additionally, sensing module 505 receives information related to possible modulation types supported by transceiver 515, possible coding rates, available power of the device, and the required bandwidth for a given data rate. Additionally, sensing module 505 receives information related to the configuration of antenna 510, such as antenna design parameters, orientation, and the parameters of the impedance matching circuit, if any.

Sensing module 505 is also connected to receive informational inputs from a network, which in the example of FIG. 5 is a wireless environment 520. These informational inputs include information in two broad categories: information related to the receipt of a transmission from transceiver 515, and information related to environmental transmission parameters. Referring now to information in the first category, in data networking and telecommunications, an acknowledgment (or ACK) is a signal passed between communicating processes or computers to signify receipt of response, as part of a communications protocol. This acknowledgment is also used in packet radio. Sensing module 505 monitors acknowledgments from a receiver of a transmission from transceiver 515 to verify the successfulness of the packet transmissions. Similar to TCP protocol, a packet radio receiver uses a sliding window flow control protocol. In each segment, the receiver specifies in the receive window field the amount of additionally received data (in bytes) that it is willing to buffer for the connection.

The system of FIG. 5 learns appropriate transmission parameters by determining whether a transmission has been received under a given set of transmission parameters. Transceiver 515 uses different communication configurations (i.e., transmission parameters) over a specific window of data packets. In some embodiments, the packets of data are transmitted by using communication configurations with known performance. In others embodiments, the packets of data are transmitted by using configurations with unknown performance. As a result, the transmitter maintains a minimum level of performance while pursuing the learning procedure, described more fully below. Transceiver 515 sets a deadline for receiving the acknowledgments of the transmitted packets; if the acknowledgments do not arrive before expiration, the transceiver 515 will send the next window of data packets by using communication configurations with known performance. In the system of FIG. 5, sensing module 505 makes use of this feedback mechanism to monitor packet drops in duplex and, as will be more fully explained below, learns from the acknowledgments.

Sensing module 505 also receives information from wireless environment 520 regarding environmental transmission parameters. As is set forth above, the HF transmission environment is highly variable, changing with solar conditions, weather, the time of day, and the locations of the transmitter and receiver. By sensing and storing historical information about the transmission environment, the system 500 of FIG. 5 correlates a given set of transmission parameters for a successful (or unsuccessful) transmission with sets of environmental parameters. This allows the system to optimize a set of transmission parameters on the basis of a sensed set of environmental transmission parameters that are the same or similar to those encountered by the system in the past. Relevant environmental transmission parameters received by sensing module 505 include geographical information (e.g., the locations of the transmitter and an acknowledging receiver), real-time MUF maps, solar flux index, information relating to geomagnetic storm conditions based on solar winds by monitoring the K-index and A-index, weather information, and time of day for gray-line propagation opportunities. These inputs gathered by sensing module 505 are used, in a parametric sense, for predicting the ionospheric conditions for the HF band quality in the area of transmission, and to select the optimum transmission configuration parameters for those conditions.

The informational inputs gathered by sensing module 505 are passed to evaluation module 525, which, like sensing module 505, is optionally implemented by a programmable computer processor running computer readable instructions stored in a non-transitory computer readable medium, for example, in storage where experience database 530 is also optionally stored. Also, as with sensing module 505, evaluation module 525 may be implemented as software or firmware running on a programmable processor housed and/or used by transceiver 515. Evaluation module 525 takes the information gathered by sensing module 505 and processes the data to calculate certain parameters of interest such as packet success rate (PSR), transmitter power consumption, and bandwidth. Additionally, evaluation module 525 correlates the sensed transmit configuration conditions and the sensed environmental transmit conditions with information regarding whether a transmission was successful or unsuccessful. This latter information can be expressed in terms of PSR, or in terms of the number of successful and failed packets. These figures of merit or demerit are stored in an experience database 530, along with correlated data regarding the associated transmit configuration conditions and environmental conditions.

In certain embodiments, experience database 530 is based on a spatio-temporal platform. Spatio-temporal and environment information is used to predict the most appropriate communication configurations based on the time, spatial location, and environment conditions. In turn, the information from the current environment conditions and learned communication configuration are indexed (by space, time, and environment attributes) and used to support future link establishment configuration. This information is multi-dimensional in nature and managing it using existing RDBMS (relational database management systems) is complex and inefficient. To overcome these conventional drawbacks, systems according to the invention achieve spatial indexing through adaptive polygonal tessellation of the globe based on the similarities of the calculations performed by evaluation module 525. Time indexing is achieved by discretization of time to adjacent time windows. Retrieval of the best link configuration is based on the Bayesian statistics.

The data representation in experience database 530 based on the spatia-temporal platform described above is in a vector form:

$$(LC, P(x,y), t, E)$$

where LC is a belief vector $\pi$ about all possible link radio configurations (set of radio transmission control parameters including modulation type, channel coding, mimo technique, etc.), $P(x,y)$ is the polygonal tessellation index for the geographic location $(x,y)$, t is the time window, and E is the environment condition. If there are X possible communication link configurations, then LC is represented by $\pi=[\pi_1\ \pi_2\ \pi_3\ \ldots\ \pi_x]$. LC reflects an assumption about the appropriateness of each possible radio configuration. Information in the polygons and polygonal tessellation uses similarities of the calculations performed by evaluation module 525. E, environmental conditions, is a vector that includes the weather information, solar flux index, etc. Experience database 530 based on the spatio-temporal platform contains and reflects the information about the regions of the ionosphere, lowest usable frequency (LUF) and maximum usable frequency (MUF), periods of increased and decreased sunspot activity (sunspot cycles), gray-line propagation, etc. respected to the specific regional areas, time and dates.

The size of the dataset in experience database 530 based on the spatio-temporal platform can significantly change (increase) based on the resolution of spatio-temporal tessellation. In the case of high resolution data for critical applications such as military and emergency applications, the stored "big data" is handled and maintained using big data handling techniques which include Hadoop, MapFeduce, Simple DB, Google BigTable, Not Only SQL (NoSQL), MemcacheDB, and Voldemort.

Further, experience database 530 provides informational inputs to learning and reasoning module 535. Learning and reasoning module 535 optimizes the transmit power, frequency and waveforms for a current transmission based on the current sensed environmental conditions, the application's objectives 545, and the learned experience of the system stored in the experience database 530. Specifically, learning and reasoning component 535 makes decisions based on the defined objective functions, input memory, and a priori information provided by the transceiver operator, and the experiential database 530. The decision is the configuration of the transmitter, which is selected based on the capability of the radio. For example, if the radio is only able to transmit with FSK and PSK modulations, the decisions options are limited to these type of modulations. Choosing an appropriate configuration depends on the experience of the CE. For instance, the learning component looks at the experience database to decide to use a configuration that has been already tested, based on the recognition that the results obtained by using this configuration will be satisfactory. Additionally or alternative, the CE can test a new configuration, or a configuration about which there is little information in the database, and will gather operational feedback resulting from this choice. This process is called "exploration".

Objective functions, in certain embodiments, include minimizing the packet error rate, however, other, more sophisticated goals are contemplated and within the scope of the invention. For example, other communication objectives, in other embodiments, also include maximizing throughput and link reliability, as well as minimizing latency, all while staying within the power budget. The learning and reasoning performed by module 535 is important because surface to surface communication over ranges of 100 s of kilometers are more successful if they can adapt to changes in radio wave propagation, e.g., due to changes in ionosphere conditions, space weather conditions and other environmental factors.

In certain embodiments, the CE finds and selects the radio configuration that maximizes expected reward. Assume that the radio has K communication configurations (a set of radio control transmission parameters, for example a combination of modulation type, channel coding, mimo technique, etc.). For each configuration k, there is a potential reward $R_k$. Each configuration is assumed to be evaluated until its eligibility or ineligibility is verified. Also, for each configuration k, there is a belief state $\pi_k(n)$ which represents the CE's knowledge about the underlying reward distribution at a time step n. $\pi(n)$ is a vector of all K belief states at time step $$n: \pi(n) = [\pi_1(n), \pi_2(n), \ldots, \pi_k(n)]^T.$$

The belief state is $(\bar{\mu}_k(n), \bar{\sigma}_k^2(n), n')$, where the parameters are the estimates of the mean $\mu_k$ and the standard deviation of the mean $\sigma_k$, using n' samples, of the underlying reward process of the each configuration k. The average (or mean or expected) reward of the best (method with the highest objective value) radio configuration is denoted as $\mu^*$. The reward depends on the objective. It can be throughput when the objective is maximizing throughput, or it can be power consumption, or spectral efficiency. If radio configuration k is used, at a time step n, a reward $R_k(n)$ is received. Therefore, the belief about the reward distribution changes from $\pi(n)$ to $\pi(n+1)$. The CE will select a communication method that maximizes the expected reward:

$$k = \underset{k \in [1,K]}{\operatorname{argmax}} E\{R_k(n) \mid \pi_k(n)\}$$

If the very recently measured results and observations do not follow or match experiential data from the experience database 530 based on the spatia-temporal platform, the CE switches to one of the ionospheric prediction models. While long-term historical information is the usual approach followed by the CE to predict spatio-temporal characteristics and communication configurations, if the very recently measured conditions and communication results deviate "substantially" from the long-term known characteristics, the adaptation will switch for a "short-term" period to one of the ionosperic forecasting models using the very recent measurements. However, if retrieved results from the experience database 530 do not lead to acceptably consistent interference prediction models for time $t^1$ to $t^2$, the distinct historical observations are still kept in the same geographical area but applied based on the channel conditions during other parts of the same day. The experience database 530 based on the spatia-temporal platform is continually updated based on recently observed RF activity and environment conditions (ionosphere reflection of the signal, received SNR, learned radio configuration, etc.). This takes care of adapting to the changes in trends of channel conditions in geographic locations, and it is done automatically in the CE.

Together, the components of the transceiver system 500 of FIG. 5 comprise a cognitive radio ("CR") managed by a cognitive engine ("CE"). In particular, the module 535, together with the associated stored data and other inputs (e.g., 530, 545 and 550) acts as a CE, which implements machine learning and artificial intelligence (AI) techniques in the HF environment. The CE acts as an intelligent agent that enables the radio to have the desired learning and adaptation abilities. This intelligent agent senses its environment (the wireless channel, the transceiver configuration and environmental parameters), and acts to appropriately tune the communication device based on its past experience. The CE also observes the result of its performance to learn additional capabilities and adds to its experience data base 530. While FIG. 5 depicts some of the standard blocks found in a general CE: it is possible to combine these blocks differently for the same purpose. Additionally, the specific algorithms used in the learning and reasoning module 535 can be varied by using different machine learning algorithms. The algorithms are adapted to the software defined radio domain and developed for the purpose of serving as a radio's CE.

Figure 12:
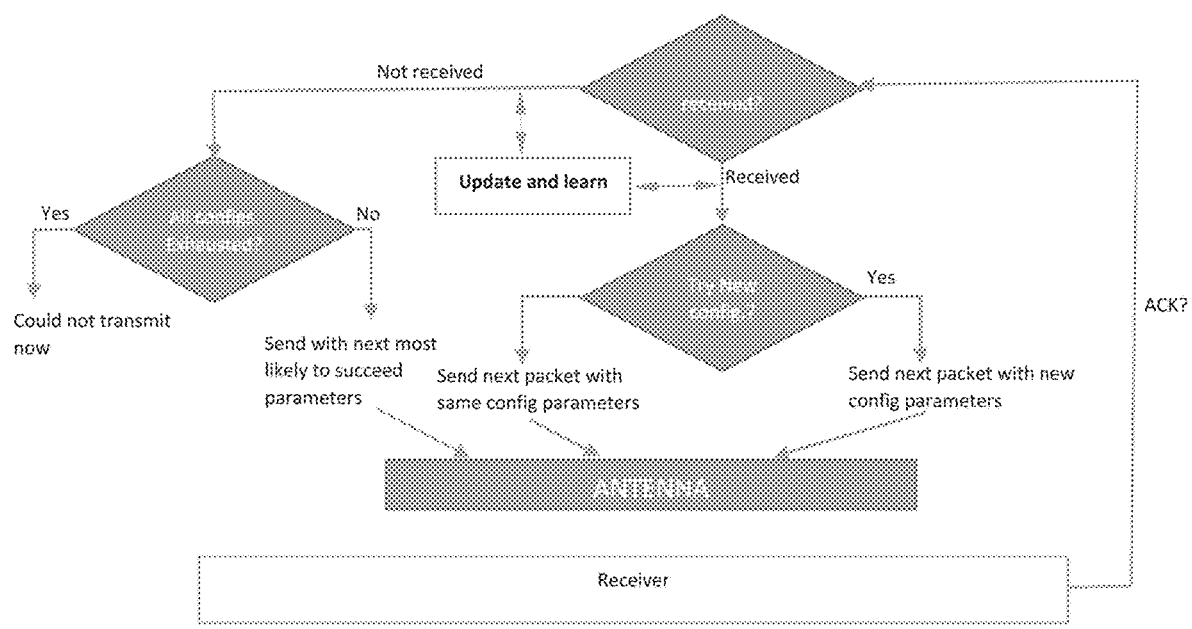
FIG. 12 is a flowchart showing an exemplary decision making process implemented by a Cognitive Engine operating according to the invention.

FIG. 12 illustrates an exemplary transmission configuration selection method and learning/exploration process available to a CE operating in accordance with the invention. In the method of FIG. 12, a transmission is sent under a given initial set of transmission parameters. If an acknowledgment packet is received indicating a successful transmission, the CE may optionally transmit the next portion of the transmission (e.g., a next packet) under the same parameters, or, in a learning stage, experiment by sending the next portion of the transmission with new configuration parameters. This learning procedure enables the system to find additional sets of transmission parameters that are likely to be successful under the current set of environmental parameters. In the event that that last packet was not received, the system determines whether all available transmission configurations have been exhausted. If not, a new set of transmission configuration parameters is selected that is the next most likely to succeed, on the basis of historical data, and the packet is resent. In the event that the system has run through the available permutations of transmission parameters, it concludes that transmission cannot occur successful under the current set of environmental conditions and the conditions of the transmitter.

Thus, SDRs operating according to the invention exploit the availability of hundreds of thousands of potential transmission configurations in an intelligent and computationally efficient manner to set up communication between the radio and a receiver. This is accomplished by a learning process, by which the system builds historical knowledge about the success of given configurations under historical transmit-receive conditions, and then compares historical conditions to current conditions to select and apply transmission parameters that are likely to be successful. An exemplary configuration space is bounded by the following transmission parameters: modulation, inner/outer codings, channel frequency and bandwidth, payload size, power level, wave form, time and time frequency synchronization methods.

The CR described in reference to FIG. 5 has certain advantages. For example, a prototype CE was developed for optimizing link adaptation. On the basis of just two numbers, the number of successful and failed packets, this prototype incorporates prior knowledge and new observations and makes all the necessary operating decisions to optimize transmission parameters over changing environmental conditions. The prototype CE design is a prime candidate for implementation in resource constrained systems while requiring minimal modifications. Additionally, CRs using a CE according to the invention can provide estimates of their expected performance, since the same two numbers can be used to calculate confidence intervals. This ability is helpful because it allows the CE to provide those estimates to the radio's operator. Additionally, CEs according to the invention learn the abilities of the radio independently from the operation objectives. This feature allows the CE to meet new objectives as fast as possible, minimizing the need to enter into a training phase. Ultimately, this will allow the CE to reach a point where it no longer needs to learn the radio's abilities, and only needs to perform optimization to meet the current objectives.

Figure 6:
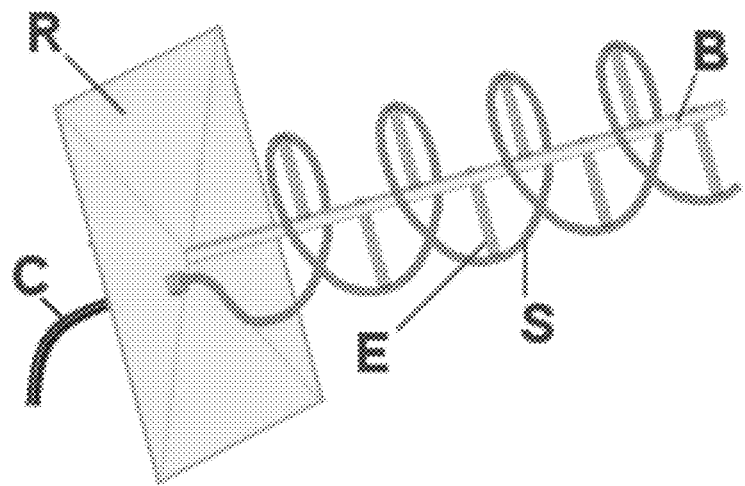
FIG. 6 is a schematic diagram of a compact helical HF antenna according to an embodiment of the invention.

Referring now to FIG. 6, certain embodiments of the invention include a helical antenna optimized for transmission and reception in the HF bands. The radiative element of the helical antenna S, in one embodiment, is a helically arranged radiating wire. Radiating sire S is electrically connected to a feed line C, which provides bidirectional signal flow. For mechanical stability radiating wire S is wound about central support B, and in some cases, is attached to central support B by insulating stand-off elements E. In other embodiments, radiative element S is wound directly around an insulating central support, such as a cylinder comprised of some insulating material. In certain embodiments, the supporting cylinder is a PVC pipe, or similar structure. At the base of the antenna of FIG. 1, a ground plane reflector R is provided, which effectively electrically doubles the length of the antenna. Ground plane R is electrically connected to ground, for example, by an electrical connection to an outside shield of feed line C, when feed line C is a coaxial cable.

Figure 11:
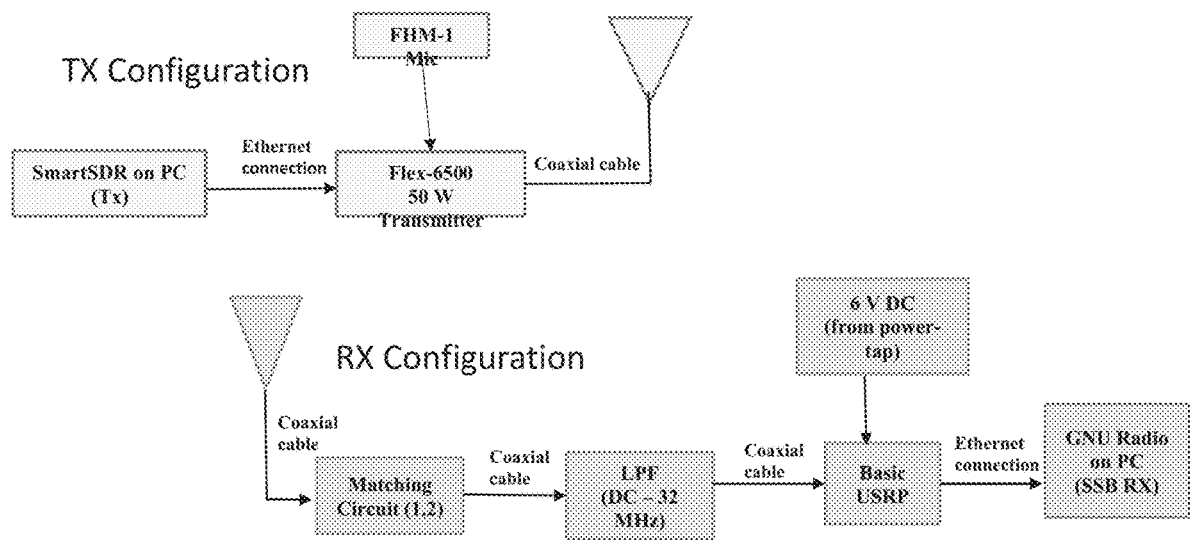
FIG. 11 shows a reception test setup for the antenna of FIG. 6 for measuring SNR.

In certain embodiments, the helical antenna of FIG. 6 is a "normal mode" helical antenna. A normal mode helical antenna is realized where the circumference of the helix is significantly less than one wavelength and its pitch (i.e., the axial distance between successive turns) is significantly less than a quarter wavelength. A normal mode helical antenna acts similarly to an electrically short dipole or monopole in terms of radiation pattern. That is, the radiation pattern from the antenna of FIG. 11, in normal mode, is mostly omnidirectional (i.e., isotropic), having a maximum at right angles to the helix axis, and a null in the axial directions. The helical antenna of FIG. 6 may also be used in axial mode, where the circumference of the helix approaches the designed-for wavelength of operation. An axial mode helical antenna has a direction of high gain that is located in the axial direction, and two side lobes at right angles to the axial direction.

The helical arrangement of radiative element S causes the antenna of FIG. 6 to act as an inductor, which makes the antenna perform like an inductive loaded monopole. This allows the radiative wire S of the helical antenna to be shorter than a quarter-wavelength at the designed-for wavelength.

Figure 7:
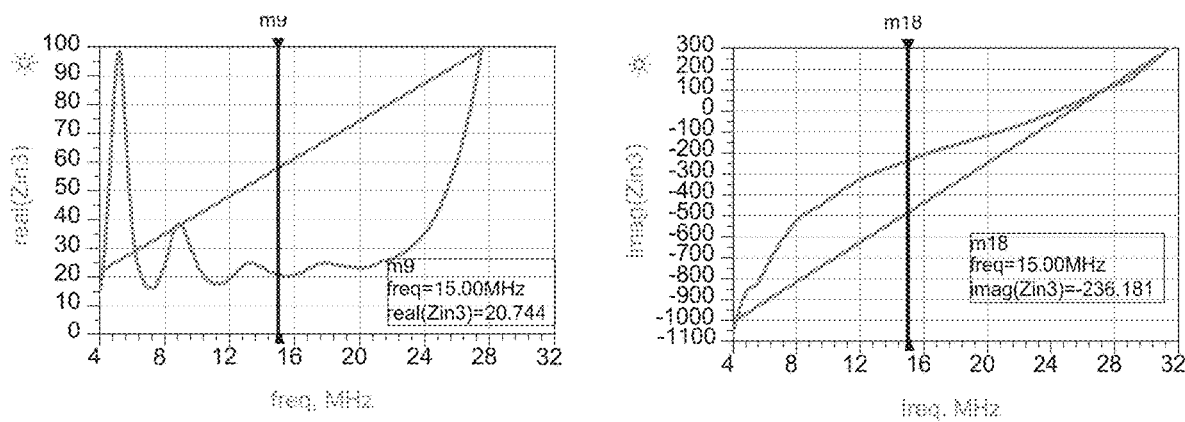
FIG. 7 shows two plots of real and imaginary impedance in Ohms for the antenna of FIG. 6.

In one exemplary embodiment of the antenna of FIG. 6, a helical antenna is provided having an overall length of about 2 m, a helix circumference of 10 cm and a helix pitch of about 17 cm. These parameters are optimized for performance at 24.5 Mhz, which for a quarter wave monopole, would ordinarily require an antenna that is 3 m long. With a circumference much smaller than ¼ wavelength at 24.5 MHz, the antenna according to this embodiment operates in normal helical mode. When performance of this antenna is modeled, it provides reasonably good wideband performance, having radiation efficiencies of 15.5, 57, 89, 93, 97 and 99% at 4, 7, 14, 18, 21 and 29 Mhz, respectively. It should be noted that the overall 2 m length of this antenna is extremely compact for large wavelength use, being about $\lambda/50$ at 3 Mhz. Additionally, it should be noted that the antenna performs well without employing measures to artificially electrically lengthen or boost the impedance of the antenna. It does not require, for example, a loading coil, which is excluded from certain embodiments. Band impedance charts, at FIG. 7 show real and imaginary measured impedance, in Ohms, for this antenna across the HF Frequency band. These results show that good matching is possible for this antenna over the entirety of the HF band.

Figure 8:
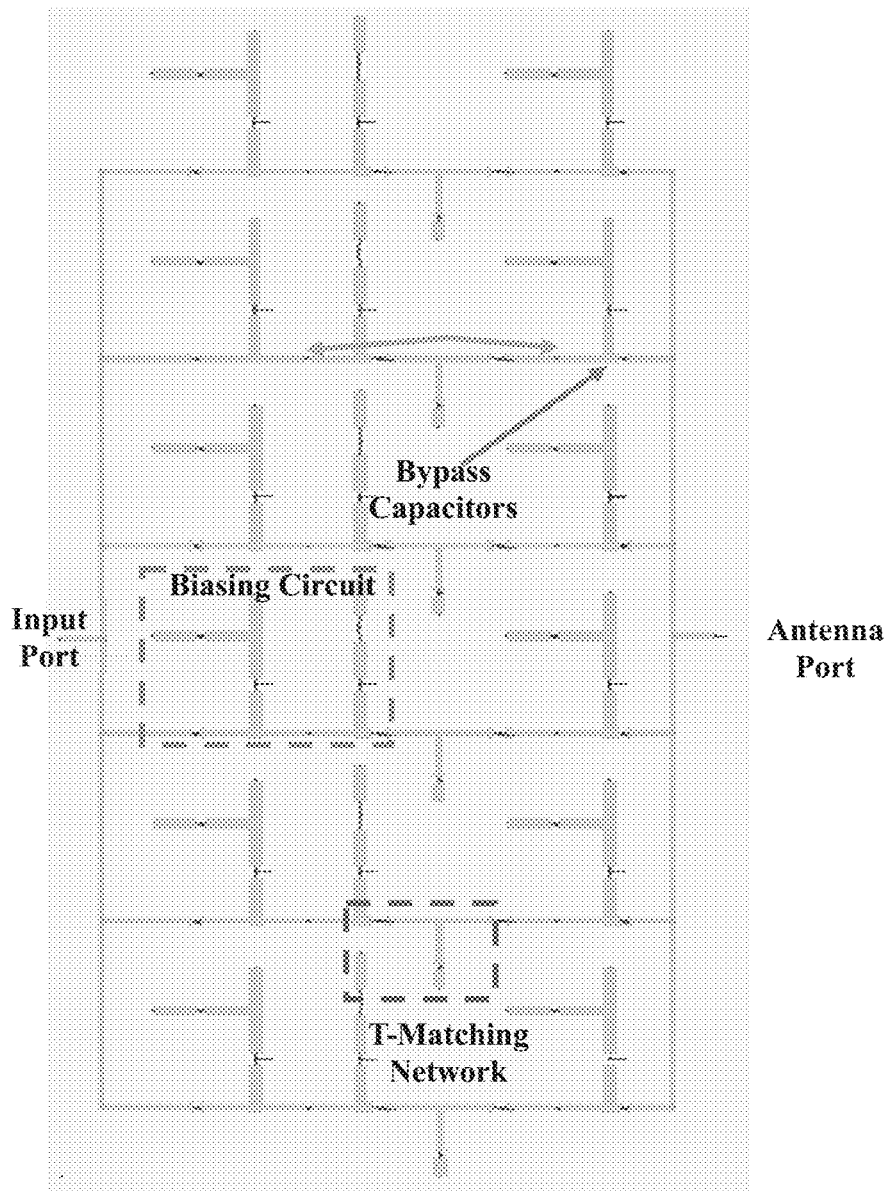
FIG. 8 is a schematic circuit diagram showing a network of passive impedance matching circuits usable with an HF antenna.

FIG. 8 shows an exemplary tuning/matching network usable with the antenna described above. In the network of FIG. 7, an array of six passive impedance matching circuits is provided. Each passive matching circuit is optimized to provide antenna impedance matching within a predetermined HF frequency band and is selectably connected between a transceiver and an antenna feed line input, depending on the operating frequency desired. The network of FIG. 7 includes six LC circuits arranged as t-matching networks.

Figure 9:
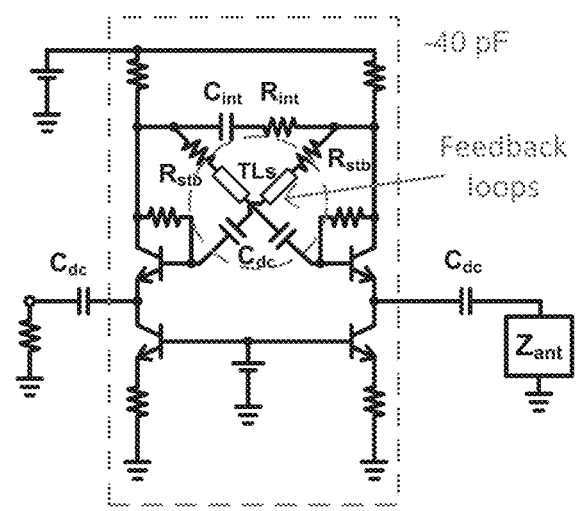
FIG. 9 is a schematic circuit diagram of a non-Foster impedance matching circuit usable with an HF antenna.

While the passive network of FIG. 8 advantageously provides effective impedance matching for multiple frequency bands using passive components, and especially good noise rejection of out-of-band noise and interference, an alternative non-Foster matching network has additional advantages. FIG. 9 shows an exemplary non-Foster matching circuit usable for wide-band impedance matching for any of the antennas described herein, and in particular, the helical antenna pictured in FIG. 1. The non-Foster network of FIG. 9 employs a stable negative capacitor based on Linvill's negative impedance converter to cancel the reactance inherent in the inductor-like antenna of FIG. 6.

Figure 10:
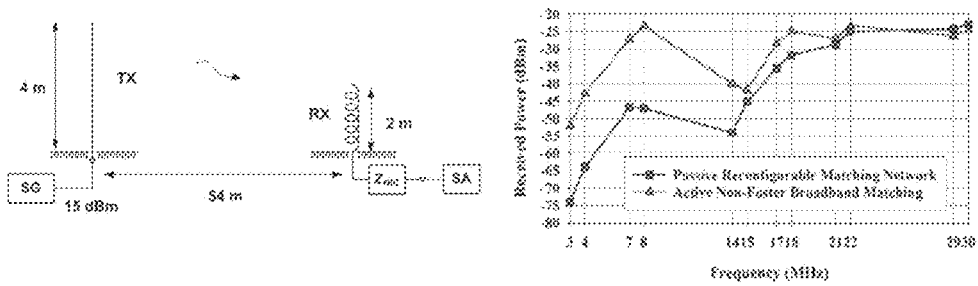
FIG. 10 shows a reception test setup for the antenna of FIG. 6, and reception test results in terms of received power for the impedance matching circuits of FIGS. 8 and 9.

When tested, the passive network of FIG. 8 and the non-Foster circuit of FIG. 9 have various relative advantages and disadvantages. When used in conjunction with the helical antenna of FIG. 6, the active non-Foster network of FIG. 9 demonstrates lower return loss, and an increase in received power, particularly under 13 Mhz, relative to the passive network of FIG. 8. The non-Foster network/helical antenna combination demonstrated received substantially higher received power when receiving controlled transmissions, as compared with the passive matching network of FIG. 8. The relative difference in received power as a function of frequency, for controlled transmit conditions, is illustrated in FIG. 10, along with a sketch of the test conditions. The transmit antenna in the setup of FIG. 10 was a commercially available 4 m whip antenna.

In other reception testing, the passive matching network of FIG. 8 was observed to have better out-of-band noise and interference rejection than the wide-band active matching circuit of FIG. 9. To test the signal-to-noise ratio of received signals as a function of frequency, a 50W transmitter transmitting an SDR generated test signal was received by receivers comprising the helical antenna of FIG. 6 matched sequentially by the passive network and the active non-Foster network. A sketch of the SNR test setup is pictured in FIG. 11, and a chart of the results is shown below. As can be seen, passive matching produces modestly better results than the active non-Foster network, likely due to better rejection of out-of-band noise and interference.

| Receiver: GNU software-defined radio (SNR dB) | | |
| --- | --- | --- |
| Frequency (MHz) | Passive Matching | Active Matching |
| 4.035 | 15 | 13 |
| 7.021 | 32 | 25 |
| 13.983 | 67 | 50 |
| 17.615 | 65 | 60 |
| 29.935 | 57 | 58 |

While the preferred embodiments of the present invention have been illustrated in detail, it should be apparent that modifications and adaptations to those embodiments may occur to one skilled in the art without departing from the scope of the present invention.

What is claimed is:

1. An HF transceiver having:
   a transmit-receive module capable of transmitting and receiving radio signals within the HF band;
   a first switching network electrically connected to the transmit-receive module;
   at least one impedance-matching circuit connected to the first switching network;
   a second switching network connected to the at least one impedance-matching circuit; and
   an electrically small antenna electrically connected to the second switching network, wherein
   the at least one impedance-matching circuit includes non-Foster elements having negative impedance over a preselected frequency range, wherein the at least one impedance-matching circuit comprises multiple impedance matching circuits, each of the multiple impedance matching circuits having an impedance designed to impedance match the electrically small antenna to the transmit-receive module at a predetermined transmit frequency, and wherein the first and second switching networks alternatively connect the transmit-receive module and the electrically small antenna to one of the multiple impedance matching circuits.

2. A method of sending an HF radio signal with a configurable HF transceiver in communication with a cognitive engine (CE), the method comprising:
   detecting a first set of environmental transmit conditions indicating radio propagation conditions of the ionosphere at a first time in the HF band;
   detecting a first set of transmit configuration conditions of the HF transceiver at the first time;
   transmitting an HF signal under the first set of environmental and transmit configuration conditions at the first time;

receiving feedback from a receiver indicating a degree to which the transmitted HF signal has been or has not been successfully received; and
storing data relating to the first set of transmit configuration conditions, the first set of environmental transmit conditions and the received feedback in a database.

3. The method of claim 2, further comprising:
if the stored data indicates that a transmitted signal has historically been successfully received under the first set of environmental transmit conditions and the first set of transmit configuration conditions, configuring the HF transceiver in accordance with the first set of transmit configuration conditions upon sensing a recurrence of the first set of environmental transmit conditions.

4. The method of claim 2, further comprising
if the stored data indicates that a transmitted signal has historically been successfully received under the first set of environmental transmit conditions and the first set of transmit configuration conditions, configuring the HF transceiver to transmit an HF signal under a second set of transmission configuration conditions and in accordance with the first set of transmit configuration conditions upon sensing a recurrence of the first set of environmental transmit conditions.

5. The method of claim 2, further comprising:
if the stored data indicates that a transmitted signal has not been successfully received under the first set of environmental transmit conditions and the first set of transmit configuration conditions, configuring the HF transceiver in accordance with a second set of transmit configuration conditions, and receiving feedback from a receiver indicating that the transmitted HF signal has been or has not been successfully received.

6. The method of claim 2, wherein the feedback from a receiver indicating that the transmitted signal has been or has not been successfully received comprises a number of successfully received and failed packets, respectively.

7. The method of claim 2, wherein the first set of environmental transmit conditions further comprises information regarding the locations of the transceiver and a receiver.

8. The method of claim 2, further comprising configuring the HF transceiver in accordance with a second set of transmit configuration conditions on the basis of stored data relating to previous sets of transmit configuration conditions and environmental transmit conditions.

9. The method of claim 2, wherein configuring the HF transceiver comprises altering one or more of the following: modulation, coding, pulse shape, and transmit power.

10. The method of claim 2, wherein the first set of environmental transmit conditions indicating radio propagation conditions of the ionosphere at the first time in the HF band comprises one or more of: real-time maximum-usable frequency ("MUF") maps, solar flux index, and geomagnetic storm conditions.

11. The method of claim 2, further comprising:
storing records relating to the success or failure of previous HF transmissions, the record including data regarding previous environmental conditions indicating radio propagation conditions of the ionosphere at a first time in the HF band at times of the previous transmissions and previous transmission conditions under which the previous transmissions were sent; and
on the basis of stored records relating to the historical success or failure of the previous transmissions under previous environmental and transmission conditions, and on the basis of contemporarily sensed environmental conditions:
predicting a set of transmission conditions including a transmission frequency in the HF band likely to result in favorable radio propagation conditions in the HF band within the ionosphere; and
causing the HF transceiver to transmit under the predicted set of transmission conditions.

12. An HF radio system, comprising:
an HF transceiver configurable to transmit an HF signal under a variety of transmit parameters;
an antenna in electronic communication with the HF transceiver;
a sensing module connected to one or more data inputs;
a programmable processor, and
non-volatile storage including computer readable instructions executable by the programmable processor to cause the programmable processor to:
determine a first set of environmental parameters indicating radio propagation conditions of the ionosphere in the HF band sensed by the sensing module at a first time,
determine a first set of transmission parameters of the HF transceiver determined by a configuration of the HF transceiver at the first time;
determine whether a first transmission sent by the HF transceiver under the first set of environmental and transmission parameters was successfully received by a receiver.

13. The system of claim 12, wherein the non-volatile storage includes computer readable instructions executable by a programmable processor to cause the programmable processor to:
store a record relating to the success or failure of the first transmission in the non-volatile storage, that record including data regarding the environmental and transmission conditions under which the transmission was sent.

14. The system of claim 13, wherein the non-volatile storage includes computer readable instructions executable by a programmable processor to cause the programmable processor to:
on the basis of stored records relating to the historical success or failure of previous transmissions under previous environmental and transmission conditions, and on the basis of contemporarily sensed environmental conditions:
predict a set of transmission conditions including a transmission frequency in the HF band likely to result in favorable radio propagation conditions in the HF band within the ionosphere; and
cause the HF transceiver to transmit under the predicted set of transmission conditions.

* * * * *